Dec. 31, 1963  C. J. STEPHENS  3,115,916

BLENDER JAR HANDLE MOUNTING STRUCTURE

Filed Sept. 7, 1962

Inventor:
Carl J. Stephens,
by T G Dusart
His Attorney.

United States Patent Office

3,115,916
Patented Dec. 31, 1963

3,115,916
BLENDER JAR HANDLE MOUNTING
STRUCTURE
Carl J. Stephens, Batavia, N.Y., assignor to General
Electric Company, a corporation of New York
Filed Sept. 7, 1962, Ser. No. 221,959
6 Claims. (Cl. 146—68)

The invention relates to electric blender jars of the type having externally driven rotary blades mounted in the bottom wall thereof, and more particularly to handle mounting structure for such jars.

The principal object of my invention is to provide an improved handle mounting structure for blender jars which may be easily assembled without special tools or fixtures and which will not be loosened by vibration or shock.

Briefly stated, in accordance with one aspect of my invention I utilize a blender jar comprising a container, a cutter mounted in the container near the bottom thereof and arranged to rotate on a vertical axis, and a drive shaft connected to the rotary cutter extending through the bottom wall of the container. The drive shaft is supported in a journal extending below and supported by the bottom wall, and holding means are provided for securing the journal in place. Blender jars of the type thus far described are known in the art and in fact have been produced by the assignee of the present invention.

In the preferred embodiment of my invention the aforesaid journal holding means include a vertically offset projecting portion spaced from the bottom surface of the bottom wall, which projecting portion may be an integral part of a washer encircling the journal and positioned between the bottom wall of the container and a nut or the like threaded on the journal. The jar is provided with a handle extending laterally from the container, and a projecting member on the lower portion of the handle extends laterally toward the journal into confined relationship between the offset projecting portion mentioned above and the bottom wall. Suitable means for securing the upper portion of the handle to the upper portion of the container are also provided, for example a metal band surrounding the upper edge of the container screwed to the upper portion of the handle.

From the foregoing it will be evident that certain parts of the rotary cutting knife assembly are utilized for the additional purpose of fastening a handle to the jar in a secure manner, and the handle may be mounted in place quite easily without special tools or fixtures.

Figure 1:
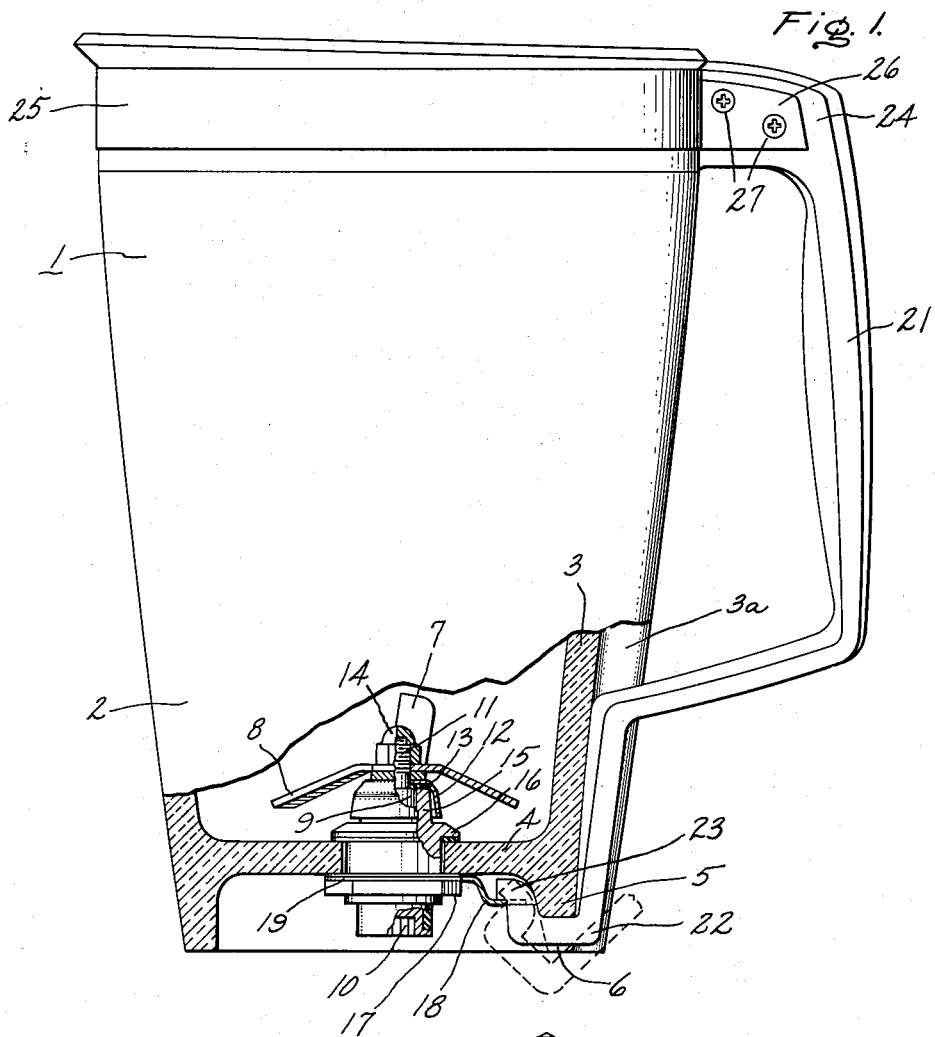
Figure 2:
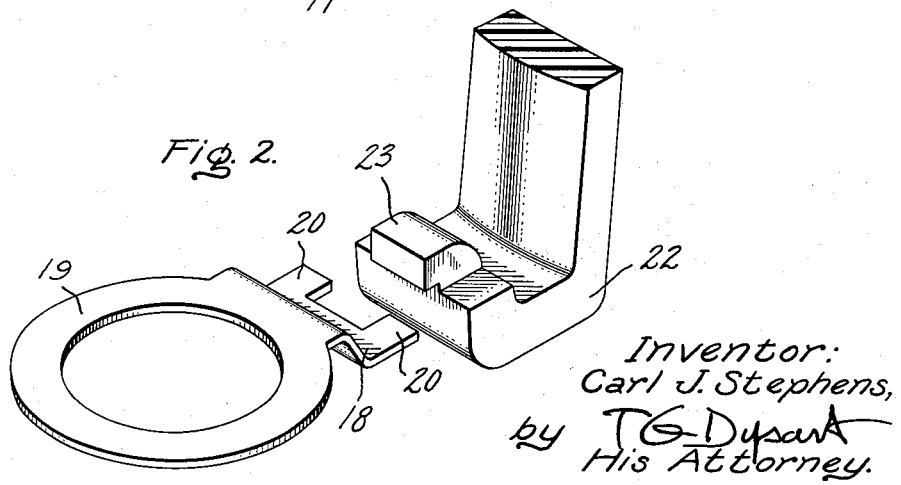

The subject matter which I regard as my invention is particularly pointed out and distinctly claimed in the concluding portion of this specification. However, the organization and method of assembly of my invention, together with further objects and advantages thereof, may be best understood by reference to the following description taken in connection with the accompanying drawing in which:

FIG. 1 is a side elevation view of a blender jar constructed in accordance with my invention, some of the parts being broken away to show the details of the construction, and FIG. 2 is a fragmentary enlarged perspective view of certain parts of the blender jar shown in FIG. 1.

Referring to the drawing, the blender jar shown in FIG. 1, which is generally designated by the numeral 1, comprises a container 2 which may be of oval cross-section, for example, when viewed from above. It is to be understood of course that containers having other configurations, such as round or rectangular containers, may also be employed. Container 2 includes a slide wall 3 and a bottom wall 4 so positioned that the lower edge of the side wall extends below the bottom wall and forms a depending skirt 5. A portion of skirt 5 is cut away to form a notch 6, the purpose of which will be described below.

Blenders of the type in which the present invention may be utilized include rotary cutting knives located in the bottom of the blender jar and connected by means of a shaft extending through the bottom wall so that the knives may be rotated at high speed by an external power source. Thus, as shown in FIG. 1, a rotary cutter including knives 7 and 8 mounted at right angles to each other, and arranged for rotation about a vertical axis is provided. Knives 7 and 8 are secured to a shaft 9 extending through the bottom wall and provided with a splined bore 10 so that the shaft may be rotated by a vertically extending power shaft (not shown) driven by an electric motor, for example. The upper end of shaft 9 includes a threaded portion 11 of smaller diameter than the main portion of the shaft extending through suitable openings in the knives 7 and 8. The horizontally flanged portion of a skirt member 12 (which aids in preventing liquid in the jar from leaking out of the jar along the outer surface of shaft 9) and a washer 13 are interposed between the upper shoulder of shaft 9 and the lower surface of blade 13. The blades are secured to shaft 9 by means of a nut 14 threaded on the upper end of threaded portion 11 of the shaft.

Shaft 9 is supported for rotation in a journal 15 provided with a flanged portion 16 overlying the portion of bottom wall 4 which surrounds a central opening in the bottom wall through which the journal extends. Preferably the outer surface of journal 15 is threaded at its lower end so as to mate with a nut 17 which together with flange 16 function to hold journal 15 securely in place on bottom wall 4. Suitable sealing material is applied to the top and bottom surfaces of bottom wall 4 in an annular zone surrounding the opening through which journal 15 extends so as to prevent the escape of liquid from the jar.

In accordance with my invention the holding means for securing journal 15 in place includes a vertically offset projecting portion 18 spaced from the bottom surface of bottom wall 4. In the presently preferred embodiment of the invention offset projecting portion 18 is an integral part of washer 19 positioned between nut 17 and the bottom wall 4. Projecting portion 18 includes a pair of arms 20 extending generally radially from the axis of shaft 9 and laterally spaced from each other. The function of the offset portion and its laterally spaced arms will become evident as the following description proceeds.

As shown in FIG. 1, blender jar 1 is provided with a handle 21 extending laterally from side wall 3. The lower portion 22 of handle 21 is positioned in a vertical flute 3a formed in side wall 3 which is in vertical alignment with notch 6 formed in depending skirt 5. Lower portion 22 of the handle is U-shaped in vertical cross-section so as to embrace the inner and outer end bottom surfaces of skirt 5, as shown in FIG. 1, it being understood that the bight of the U-shaped lower portion 22 extends through notch 6. A projecting member 23 on lower handle portion 22 extends laterally toward journal 15 into confined relationship between offset projecting portion 18 and bottom wall 4. Further, the width of projecting member 23 is such that it fits between and it is confined by arms 20 of offset portion 18. Thus, when the parts described above are assembled as shown in FIG. 1 lower portion 22 of handle 21 is confined both vertically and laterally, and is securely held to the blender jar.

The upper portion 24 of handle 21 may be secured to the upper portion of container 2 by any suitable means, and in the present embodiment a metal band 25 is utilized for this purpose. Band 25 encompasses the uppermost portion of container 2 and includes a pair of laterally spaced parallel terminal portions 26 (only one of which appears in FIG. 1) arranged to lie against opposite sides of upper handle portion 24. Portions 26 of band 25 are secured to handle portion 24 by suitable fastening means such as screws 27.

Handle 21 is secured to container 2 as shown in FIG. 1 in the following manner. First, the cutter blade assembly is placed in position as shown in the drawing and the holding means for securing journal 15 in position are likewise assembled, with the parts in the positions described above. More specifically, journal 15 is placed in the central opening in bottom wall 4, sealing material is placed on the top and bottom surfaces of bottom wall 4 surrounding the opening and washer 19 and nut 17 are assembled on the lower end of the journal. The nut is then tightened to its final position.

Handle 21 may then be placed in relation to container 2 so that lower handle portion 22 occupies the position indicated in broken lines in FIG. 1, that is, it is positioned so that projecting member 23 may enter the space between offset projecting portion 18 and bottom wall 4. Handle 21 is then rotated counter-clockwise, as viewed in FIG. 1, about a horizontal axis extending generally through projecting member 23 to the position shown in full lines therein. Band 25 may be placed in position adjacent the upper edge of container 2 either before or after the assembly steps just described. In any event, as soon as handle 21 and band 25 occupy the position shown in FIG. 1, screws 27 may be screwed into place so as to complete the assembly of the handle to the blender jar.

While I have shown and described a particular embodiment of my invention, I do not desire the invention to be limited to the particular construction disclosed, and I intend by the appended claims to cover all modifications within the true spirit and scope of my invention.

What I claim is:

1. A blender jar comprising a container having a side wall and a bottom wall, rotary cutting means mounted in said container, a shaft for rotating said cutting means extending through said bottom wall, a journal surrounding said shaft and extending below said bottom wall, a shoulder on said journal overlying a portion of the top surface of said bottom wall, holding means secured to the lower end of said journal for holding the journal in fixed relation to said bottom wall, said holding means including a vertically offset projecting portion spaced from the bottom surface of said bottom wall, a handle extending laterally from the side wall of said container, a projecting member on the lower portion of said handle extending laterally toward said journal into confined relationship between said offset projecting portion of said holding means and said bottom wall, and means for securing the upper portion of said handle to the upper portion of said side wall.

2. A blender jar comprising a container having a side wall and a bottom wall, rotary cutting means mounted in said container, a shaft for rotating said cutting means extending through said bottom wall, a journal surrounding said shaft and extending below said bottom wall, a shoulder on said journal overlying a portion of the top surface of said bottom wall, holding means secured to the lower end of said journal for holding the journal in fixed relation to said bottom wall, said holding means including a vertically offset projecting portion spaced from the bottom surface of said bottom wall, said projecting portion including a pair of arms extending generally radially from the axis of said shaft and laterally spaced from each other, a handle extending laterally from the side wall of said container, a projecting member on the lower portion of said handle extending laterally toward said journal into confined relationship between said offset projecting portion of said holding means and said bottom wall, said projecting member being of a width such that it fits between and is confined by said pair of arms, and means for securing the upper portion of said handle to the upper portion of said side wall.

3. A blender jar comprising a container having a side wall and a bottom wall so positioned that the lower edge of said side wall extends below said bottom wall to form a depending skirt, a portion of said skirt being cut away to form a notch, a rotary cutting means mounted in said container, a shaft for rotating said cutting means extending through said bottom wall, a journal surrounding said shaft and extending below said bottom wall, a shoulder on said journal overlying a portion of the top surface of said bottom wall, holding means secured to the lower end of said journal for holding the journal in fixed relation to said bottom wall, said holding means including a vertically offset projecting portion spaced from the bottom surface of said bottom wall, said projecting portion including a pair of arms extending generally radially from the axis of said shaft and laterally spaced from each other, a handle extending laterally from the side wall of said container, the lower portion of said handle extending laterally through said notch toward said journal, said lower portion being U-shaped in vertical cross-section so as to embrace the inner and outer and bottom surfaces of said skirt, a projecting member on said lower portion of said handle extending laterally toward said journal into confined relationship between said offset projecting portion of said holding means and said bottom wall, said projecting member being of a width such that it fits between and is confined by said pair of arms, and means for securing the upper portion of said handle to the upper portion of said side wall.

4. A blender jar comprising a container having a side wall and a bottom wall, rotary cutting means mounted in said container, a shaft for rotating said cutting means extending through said bottom wall, an externally threaded journal surrounding said shaft and extending below said bottom wall, a shoulder on said journal overlying a portion of the top surface of said bottom wall, a nut threaded on the lower end of said journal, a washer located between the bottom surface of said bottom wall and said nut, said washer having a vertically offset projecting portion spaced from the bottom surface of said bottom wall, a handle extending laterally from the side wall of said container, a projecting member on the lower portion of said handle extending laterally toward said journal into confined relationship between said projecting portion on said washer and said bottom wall, and means for securing the upper portion of said handle to the upper portion of said side wall.

5. A blender jar comprising a container having a side wall and a bottom wall, rotary cutting means mounted in said container, a shaft for rotating said cutting means extending through said bottom wall, an externally threaded journal surrounding said shaft and extending below said bottom wall, a shoulder on said journal overlying a portion of the top surface of said bottom wall, a nut threaded on the lower end of said journal, a washer located between the bottom surface of said bottom wall and said nut, said washer having a vertically offset projecting portion spaced from the bottom surface of said bottom wall, said projecting portion including a pair of arms extending generally radially from the axis of said shaft and laterally spaced from each other, a handle extending laterally from the side wall of said container, a projecting member on the lower portion of said handle extending laterally toward said journal into confined relationship between said projecting portion on said washer and said bottom wall, said projecting member being of a width such that it fits between and is confined by said pair of arms, and means for securing the upper portion of said handle to the upper portion of said side wall.

6. A blender jar comprising a container having a side wall and a bottom wall so positioned that the lower edge of said side wall extends below said bottom wall to form a depending skirt, a portion of said skirt being cut away to form a notch, rotary cutting means mounted in said container, a shaft for rotating said cutting means extending through said bottom wall, an externally threaded journal surrounding said shaft and extending below said bottom wall, a shoulder on said journal overlying a portion of the top surface of said bottom wall, a nut threaded on the lower end of said journal, a washer located between the bottom surface of said bottom wall and said nut, said washer having a vertically offset projecting portion spaced from the bottom surface of said bottom wall, said projecting portion including a pair of arms extending generally radially from the axis of said shaft and laterally spaced from each other, a handle extending laterally from the side wall of said container, the lower portion of said handle extending laterally through said notch toward said journal, said lower portion being U-shaped in vertical cross-section so as to embrace the inner and outer and bottom surfaces of said skirt, a projecting member on said lower portion of said handle extending laterally toward said journal into confined relationship between said projecting portion on said washer and said bottom wall, said projecting member being of a width such that it fits between and is confined by said pair of arms, and means for securing the upper portion of said handle to the upper portion of said side wall.

No references cited.